(12) United States Patent
Oka et al.

(10) Patent No.: US 12,511,732 B2
(45) Date of Patent: Dec. 30, 2025

(54) METHOD FOR INDIVIDUAL RECOGNITION OF FIBER-REINFORCED PLASTIC

(71) Applicant: TEIJIN LIMITED, Osaka (JP)

(72) Inventors: Hayato Oka, Osaka (JP); Kaori Tanigami, Osaka (JP); Chio Mineo, Osaka (JP)

(73) Assignee: TEIJIN LIMITED, Osaka (JP)

( * ) Notice: Subject to any disclaimer, the term of this patent is extended or adjusted under 35 U.S.C. 154(b) by 279 days.

(21) Appl. No.: 18/285,993

(22) PCT Filed: Apr. 8, 2022

(86) PCT No.: PCT/JP2022/017430
§ 371 (c)(1),
(2) Date: Oct. 6, 2023

(87) PCT Pub. No.: WO2022/224852
PCT Pub. Date: Oct. 27, 2022

(65) Prior Publication Data
US 2024/0185410 A1    Jun. 6, 2024

(30) Foreign Application Priority Data
Apr. 20, 2021 (JP) ................ 2021-071135

(51) Int. Cl.
*G06T 7/00* (2017.01)
*G06V 20/80* (2022.01)

(52) U.S. Cl.
CPC .............. *G06T 7/001* (2013.01); *G06V 20/80* (2022.01); *G06T 2207/30164* (2013.01)

(58) Field of Classification Search
CPC .......... G06T 7/001; G06T 2207/30164; G06V 20/80
See application file for complete search history.

(56) References Cited

U.S. PATENT DOCUMENTS 4,506,914 A * 3/1985 Gobeli ................. G07D 7/12
283/85
5,464,671 A * 11/1995 Harada .................. B60R 19/03
283/109
(Continued)

FOREIGN PATENT DOCUMENTS

JP        2001-38733 A     2/2001
JP        2012-198848 A    10/2012
(Continued)

OTHER PUBLICATIONS

International Search Report (PCT/ISA/210) issued Jun. 14, 2022 by the International Searching Authority in counterpart International Patent Application No. PCT/JP2022/017430.
(Continued)

*Primary Examiner* — Casey L Kretzer
(74) *Attorney, Agent, or Firm* — Sughrue Mion, PLLC

(57) ABSTRACT

This method for individual recognition of fiber-reinforced plastic comprises the following steps. Step 101 is a step for: acquiring identification information in advance for a fiber-reinforced plastic in order to acquire an identification information image P1; and creating a database in which manufacturing information for the fiber-reinforced plastic is associated with the identification information image P1 and stored. Step 201 is a step for, after Step 101, acquiring identification information for a fiber-reinforced plastic in order to acquire an identification information image P2. Step 301 is a step for comparing the acquired recognition information image P2 to the recognition information image P1 stored in the database in order to perform individual recognition of the fiber-reinforced plastic, with the caveat that a resin M1 contained in the fiber-reinforced plastic in Step 101 has a greater number average molecular weight than a resin M2 contained in the fiber-reinforced plastic in Step 201.

10 Claims, 3 Drawing Sheets

(56) References Cited

U.S. PATENT DOCUMENTS

| | | | |
|---|---|---|---|
| 2017/0028614 A1 | 2/2017 | Koike et al. | |
| 2019/0035136 A1* | 1/2019 | Shin | C12Q 1/68 |
| 2020/0079037 A1* | 3/2020 | Niesner | B29C 70/548 |

FOREIGN PATENT DOCUMENTS

| | | | |
|---|---|---|---|
| JP | 2013-232069 A | 11/2013 | |
| JP | 2019-168765 A | 10/2019 | |
| WO | 2015/137093 A1 | 9/2015 | |

OTHER PUBLICATIONS

Written Opinion (PCT/ISA/237) issued Jun. 14, 2022 by the International Searching Authority in counterpart International Patent Application No. PCT/JP2022/017430.

* cited by examiner

METHOD FOR INDIVIDUAL RECOGNITION OF FIBER-REINFORCED PLASTIC

CROSS-REFERENCE TO RELATED APPLICATIONS

This application is a National Phase Entry of PCT International Application No. PCT/JP2022/017430 filed on Apr. 8, 2022, which claims priority to Japanese Patent Application No. 2021-071135 filed on Apr. 20, 2021, the contents of all of which are incorporated herein by reference in their entirety.

TECHNICAL FIELD

The present invention relates to a method of recognizing individual fiber-reinforced plastics based on captured images of fiber-reinforced plastics.

BACKGROUND ART

Conventionally, QR code (registered trademark) is printed on a surface of a fiber-reinforced plastic by LASER marking as in the invention described in Patent Literature 1, for example, and individually authentication has been performed by reading the QR code with a scanner. The QR code (registered trademark) contains product information of the fiber-reinforced plastic.

On the other hand, as a method of individual authentication of an object, for example, Patent Literature 2 discloses an invention relating to an object identification device provided with an image processing unit that identifies a kind of the object by: capturing an image picked up by a capturing unit on two or more objects placed on the same plane; and recognizing the image.

Patent Literature 3 provides a medical material recognition system that can easily and quickly recognize medical materials and can be used for accurate aggregation and management.

In Patent Literature 4, individual identification of each sintered product is performed in order to understand manufacturing conditions and facilitate investigation of a cause of occurrence of a defect.

CITATION LIST

Patent Literature

Patent Literature 1: WO2015/137093
Patent Literature 2: JP-A-2012-198848
Patent Literature 3: JP-A-2019-168765
Patent Literature 4: JP-A-2013-232069

SUMMARY

Technical Problem

However, an expensive dedicated marking device is required to use the laser marking described in Patent Literature 1. In addition, since a marking trace (for example, a QR code (registered trademark)) is left on a part of the product, the application is difficult for the product requiring an appearance.

The individual authentication described in Patent Literature 2 can recognize different types of breads, but cannot distinguish between the same type of breads, and therefore cannot be used for tracking after product shipment.

The medical material recognition system described in Patent Literature 3 identifies the type of the medical material from characteristics such as characters and figures intentionally and explicitly given to the packaging material, but cannot identify the product itself without the packaging material. In addition, since it is not possible to distinguish between the same type of medical materials, it cannot be used for tracking after product shipment.

Patent Literature 4 does not disclose the individual identification method of fiber-reinforced plastics, and does not sufficiently examine the individual recognition of the fiber-reinforced plastics.

In view of the problems of the prior art, it is an object of the present invention to provide a method for individual recognition of fiber-reinforced plastic, the method does not require a process for identification and equipment therefor such as the expensive dedicated marking device.

Solution to Problem

As a result of intensive studies, the present inventors have found that the above-described problems can be solved by the following means. Thus, the present invention has been completed.

1. A method for individual recognition of fiber-reinforced plastic, comprising the following steps.
    Step 101: Acquiring identification information of a fiber-reinforced plastic in advance to acquire an identification information image P1 of a fiber-reinforced plastic, and creating a database in which the identification information image P1 is stored in association with information of a product of the fiber-reinforced plastic;
    Step 201: Acquiring identification information and an identification information image P2 of a fiber-reinforced plastic after Step 101;
    Step 301: Performing individual recognition of the fiber-reinforced plastic by collating the acquired identification information image P2 with the identification information image P1 stored in the database,
    in which a resin M1 contained in a product of the fiber-reinforced plastic in Step 101 has a larger number average molecular weight than a resin M2 contained in a product of the fiber-reinforced plastic in Step 201.
2. The method for individual recognition of fiber-reinforced plastic according to 1 above, wherein the product information includes at least one of a fiber length, a fiber volume fraction, a brand of fibers, a brand of a resin, a manufacturing date, a manufacturing time, or a product serial number.
3. The method for individual recognition of fiber-reinforced plastic according to any one of 1 or 2 above, wherein the fiber-reinforced plastic in Step 101 is a molding material; and the fiber-reinforced plastic in Step 201 is a molded body obtained by compression-molding the molding material.
4. The method for individual recognition according to 3 above, wherein the compression-molding is cold-press molding using a mold including an upper mold and a lower mold, and the identification information is a surface image of the fiber-reinforced plastic on a side in contact with the lower mold.
5. The method for individual recognition according to 4 above, wherein the identification information is present in a non-flowing region or a low-flowing region.

6. The method for individual recognition of fiber-reinforced plastic according to any one of 1 to 5 above, wherein discontinuous fibers are randomly arranged on surfaces of the fiber-reinforced plastic, and the identification information is acquired from the randomly arranged discontinuous fibers.

7. The method for individual recognition of fiber-reinforced plastic according to 6 above, wherein the discontinuous fibers include discontinuous fiber bundles A1, and the identification information image P1 contains 2000 mm² or more of an area of the discontinuous fiber bundles A1.

8. The method for individual recognition of fiber-reinforced plastic according to any one of 1 to 7 above, wherein the identification information image is non-destructive inspection data.

9. The method for individual recognition of fiber-reinforced plastic according to any one of 1 to 8 above, wherein line scan illumination or dome-shaped illumination is used for capturing the identification information of the fiber-reinforced plastic.

10. A method comprising:
evaluating a deterioration degree of a resin contained in a fiber-reinforced plastic after performing individual recognition using the method for individual recognition of fiber-reinforced plastic according to any one of 1 to 9.

Advantageous Effect of the Invention

Since the method for individual recognition of fiber-reinforced plastic is based on the unique appearance information possessed by the fiber-reinforced plastic, the method does not require the expensive dedicated marking device and a process for identification and equipment therefor.

In addition, since the present invention recognizes the unique pattern possessed by the fiber-reinforced plastic, the products can be individually identified even if the products are of the same brand, and tracking can be performed after the products are shipped.

DESCRIPTION OF EMBODIMENTS

Figure 1:
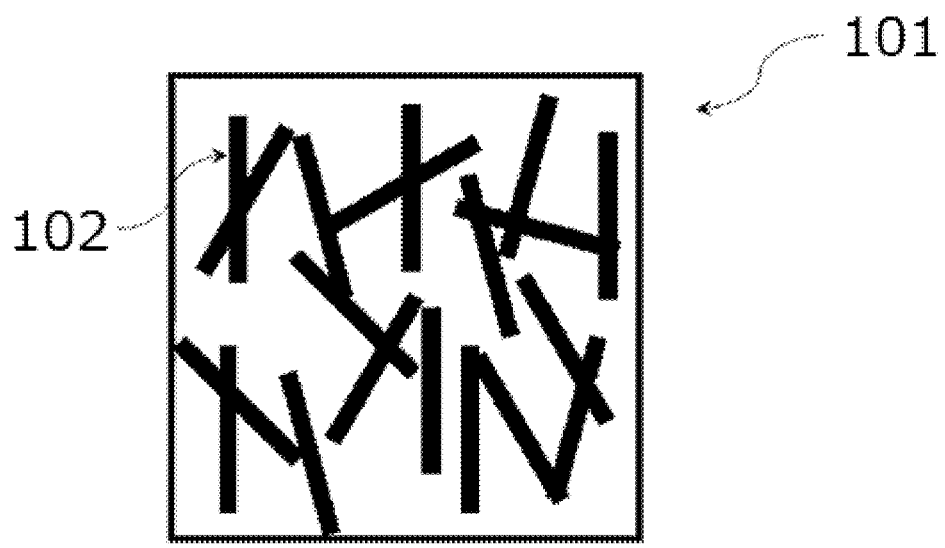
FIG. 1 is a schematic diagram of a fiber-reinforced plastic in which reinforcing fibers are discontinuous fibers and are randomly arranged in two-dimension.

Hereinafter, embodiments of the present invention will be described with reference to the drawings, but the present invention is not limited thereto.

[Reinforcing Fiber]

1. Type

The fiber-reinforced plastic of the present invention contains reinforcing fibers. The reinforcing fibers are not particularly limited, but it is preferably one or more reinforcing fibers selected from the group consisting of carbon fibers, glass fibers, aramid fibers, boron fibers, and basalt fibers.

When PAN-based carbon fibers are used as the reinforcing fibers, the tensile modulus thereof is preferably within a range of 100 GPa to 600 GPa, more preferably within a range of 200 GPa to 500 GPa, and still more preferably within a range of 230 GPa to 450 GPa. The tensile strength is preferably within a range of 2000 MPa to 6000 MPa, and more preferably within a range of 3000 MPa to 6000 MPa.

2. Discontinuous Fiber

The reinforcing fibers preferably include discontinuous fibers. When discontinuous fibers are used, formability is improved compared to a fiber-reinforced plastic using only continuous fibers, and it becomes easy to produce a molded body having a complicated shape.

3. Weight Average Fiber Length of Reinforcing Fibers

The reinforcing fibers used in the present invention may be discontinuous reinforcing fibers, and the weight average fiber length may be 1 mm to 100 mm. The weight average fiber length of the discontinuous reinforcing fibers is more preferably 3 mm to 80 mm, and still more preferably 5 mm to 60 mm. When the weight average fiber length is 100 mm or less, the fluidity of the molding material is improved when the fiber-reinforced plastic is used as the molding material, and a desired shape of the molded body is easily obtained by compression-molding, for example. On the other hand, when the weight average fiber length is 1 mm or more, the mechanical strength of the fiber-reinforced plastic is improved.

In the present invention, reinforcing fibers having different fiber lengths may be used in combination. In other words, the reinforcing fibers used in the present invention may have a single peak in the weight average fiber lengths, or may have a plurality of peaks.

The average fiber length of the reinforcing fibers can be obtained, for example, by measuring the fiber lengths of 100 fibers randomly extracted from the fiber-reinforced plastic in millimeters using vernier calipers or the like, and calculating the following equation. The average fiber length is measured by weight average fiber length (Lw). The number average fiber length (Ln) and the weight average fiber length (Lw) are determined by the following formulas (1) and (2), where Li is the fiber length of each reinforcing fiber and j is the number of measured fibers.

$$Ln = \Sigma Li/j \qquad \text{Formula (c)}$$

$$Lw(\Sigma Li^2)/(\Sigma Li) \qquad \text{Formula (d)}$$

When the fiber length is constant, the number average fiber length and the weight average fiber length are the same.

The reinforcing fibers can be extracted from the fiber-reinforced plastic by, for example, subjecting the fiber-reinforced plastic to a heat treatment at 500° C. for about 1 hour and removing the resin in a furnace.

4. Volume Fraction of Fibers

The fiber volume fraction Vf of the reinforcing fibers is not particularly limited, but is preferably 20% to 70%, more preferably 25% to 60%, and still more preferably 30% to 55%.

The fiber volume fraction (Vf, unit: volume %) is a ratio of the volume of the reinforcing fibers to the total volume including not only the reinforcing fibers and the matrix resin but also other additives and the like.

5. Fiber Diameter

When the reinforcing fibers used in the present invention are carbon fibers, the fiber diameter of the carbon fibers is preferably within a range of usually 3 μm to 50 μm, more preferably within a range of 4 μm to 12 μm, and still more preferably within a range of 5 μm to 8 μm, as an average fiber diameter. Here, the average "fiber diameter" refers to a diameter of a single carbon fiber. Therefore, when the carbon fibers are in the form of fiber bundles, the diameters of the fiber bundles constituting the fiber bundles are referred to, not the diameters of the fiber bundles. The average fiber diameter of the carbon fibers can be measured, for example, by a method described in JIS R-7607: 2000.

When the glass fibers are used as the reinforcing fibers, the average fiber diameter of the glass fibers is preferably 1 μm to 50 μm, and more preferably 5 μm to 20 μm. When the average fiber diameter is large, the impregnating property of the resin into the fibers is easy, and when the average fiber diameter is equal to or lower than the upper limit, the moldability and the processability are good.

6. Fiber Bundle

When the reinforcing fibers are discontinuous fibers and used by opening the fiber bundles, the reinforcing fibers contained in the fiber-reinforced plastic may be only single filaments, may be only fiber bundles, or may be a mixture of both. When the reinforcing fibers used in the present invention have fiber bundle shapes, the number of single fibers (also referred to as monofilaments or the like) constituting each fiber bundle is not particularly limited, but is usually within a range of 1000 to 0.1 million. When carbon fibers are used as reinforcing fibers, carbon fibers generally have a fiber bundle shape in which thousands to tens of thousands of single fibers are aggregated. When the carbon fibers are used as they are, the entangled portions of the fiber bundles become locally thick, and it may be difficult to obtain a thin impact absorption member. Therefore, when carbon fibers are used as reinforcing fibers, it is usual to widen or open the fiber bundle.

More specifically, it is preferable to include a reinforcing fiber bundle (A) composed of a critical number of single fibers or more defined by the following formula (a), and other opened reinforcing fibers (B), that is, a fiber bundle composed of a monofilament state or less than the critical number of single fibers.

$$\text{Critical number of single fibers} = 600/D \quad \text{formula (a)}$$

(Here, D is an average fiber diameter (μm) of reinforcing fibers.)

The degree of opening of the reinforcing fibers can be set within a target range by adjusting the opening conditions of the fiber bundles, for example, by adjusting the pressure of the air blown in the opening step.

In the present invention, when the reinforcing fibers are discontinuous fibers and the discontinuous fibers include the discontinuous fiber bundles A1, the average number (N) of fibers in the discontinuous fiber bundles A1 can be appropriately determined within a range not impairing the object of the present invention, and is not particularly limited, but is preferably satisfied by the following formula (b).

$$0.6 \times 10^4/D^2 < N < 6 \times 10^5/D^2 \quad \text{formula (b)}$$

(Here, D is an average fiber diameter (μm) of reinforcing fibers)

Specifically, when the reinforcing fibers contained in the fiber-reinforced plastic are carbon fibers having the average fiber diameter of 5 to 7 μm, the critical number of single fibers is 86 to 120. When the average fiber diameter of the carbon fibers is 5 μm, the average number (N) of fibers in the carbon fiber bundles is 240 to 24000, but is more preferably 300 to 10000, and even more preferably 500 to 5000. When the average fiber diameter of the carbon fibers is 7 μm, the average number (N) of fibers in the carbon fiber bundles is 122 to 12200, but is more preferably 200 to 5000, and still more preferably 300 to 3000. When the average number (N) of fibers in the carbon fiber bundles is $0.6 \times 10^4/D^2$ or more, it is easy to increase the volume fraction (Vf) of the carbon fibers in the fiber-reinforced plastic, and consequently, desired mechanical properties are easily obtained. On the other hand, when the average number (N) of fibers in the carbon fiber bundles is $6 \times 10^5/D^2$ or less, a locally thick portion is less likely to be generated, and voids are less likely to be generated in the fiber-reinforced plastic.

7. Orientation of Reinforcing Fibers

Examples of the oriented state of the reinforcing fibers contained in the fiber-reinforced plastic include a unidirectional arrangement in which the long-axis directions of the reinforcing fibers are arranged in one direction, or a two-dimensional random arrangement in which the long-axis directions are randomly arranged in the in-plane directions of the molding material.

The oriented state of the reinforcing fibers in the present invention may be either the above-described unidirectional arrangement or a two-dimensional random arrangement. In addition, the oriented state may be an irregular arrangement (an arrangement state in which the long axis directions of reinforcing fibers are not completely arranged in one direction and are not completely random) between the unidirectional arrangement and the two-dimensional random arrangement. Further, depending on the fiber length of the reinforcing fibers, the reinforcing fibers may be arranged so that the long-axis directions of the reinforcing fibers may be angled with respect to the in-plane directions of the fiber-reinforced plastic. The reinforcing fibers may be arranged so that the fibers are entangled in a cotton-like manner, or may further be arranged in bidirectional fabrics such as plain weaves and twill weaves, multiaxial woven fabrics, nonwoven fabrics, mats, knits, braided cords, paper made from reinforcing fibers, or the like.

The reinforcing fibers in the present invention may be in a state of a reinforcing fiber mat. The reinforcing fiber mat refers to those in which reinforcing fibers are deposited or entangled to form a mat. Examples of the reinforcing fiber mat include a two-dimensional random reinforcing fiber mat in which long-axis directions of the reinforcing fibers are randomly arranged in in-plane directions of the fiber-reinforced plastic, or a three-dimensional random reinforcing fiber mat in which long-axis directions of the reinforcing fibers are randomly arranged in each direction of XYZ by entangling the reinforcing fibers like cotton, for example.

For example, an oriented state of the two-dimensional random arrangement of the reinforcing fibers in the fiber-reinforced plastic can be confirmed by: performing tensile tests on an arbitrary direction of the fiber-reinforced plastic and on a direction orthogonal thereto to measure tensile moduli; and then calculating a ratio (Eδ) of a larger value divided by a smaller value of the measured tensile moduli. The closer the ratio of the elastic moduli to 1, the more likely it can be evaluated that the reinforcing fibers are randomly arranged in two dimensions. It is considered isotropic when the ratio of the larger value divided by the smaller value of the tensile moduli in two orthogonal directions is not more than 2. It is evaluated as excellent in isotropy when the ratio is not more than 1.3.

A method of controlling the arrangement of the directions of the reinforcing fibers is not particularly limited, but it can be achieved by specifically using a method of using a fiber bundle for the shape of the reinforcing fibers, an air laid method, a carding method, and a paper making method during production of the fiber-reinforced plastic.

[Resin]

The type of the resin is not particularly limited in the present invention, and a thermosetting resin or a thermoplastic resin may be used. When the thermosetting resin is used, the resin is preferably an unsaturated polyester resin, a vinyl ester resin, an epoxy resin, or a phenolic resin.

One kind of the resin may be used alone, or two or more kinds of resins may be used in combination.

[Sheet Molding Compound]

The fiber-reinforced plastic of the present invention may be formed by molding a sheet molding compound (sometimes referred to as SMC) using reinforcing fibers. Since the sheet molding compound has high moldability, it can be easily molded even in a complicated shape such as a battery tray or a battery cover.

As the fiber-reinforced plastic using the sheet molding compound (SMC), a sheet molding compound manufactured by Continental Structural Plastics Ltd. (sometimes abbreviated as CSP) can be used.

[Other Agents]

The fiber-reinforced resin used in the present invention may contain additives such as various fibrous fillers such as organic fibers or inorganic fibers, or non-fibrous fillers, flame retardants, UV resistant agents, stabilizers, mold release agents, pigments, softeners, plasticizers, and surfactants.

When the thermosetting resin is used, it may contain a thickener, a curing agent, a polymerization initiator, a polymerization inhibitor, or the like. One kind of the additive may be used alone, or two or more kinds of additives may be used in combination.

[Method for Individual Recognition]

A method for individual recognition of fiber-reinforced plastic in the present invention includes the following steps 101, 201, and 301.

Step 101: Acquiring identification information of a fiber-reinforced plastic in advance to acquire an identification information image P1 of a fiber-reinforced plastic, and creating a database in which the identification information image P1 is stored in association with information of a product of the fiber-reinforced plastic;

Step 201: Acquiring identification information and an identification information image P2 of a fiber-reinforced plastic after Step 101;

Step 301: Performing individual recognition of the fiber-reinforced plastic by collating the acquired identification information image P2 with the identification information image P1 stored in the database, wherein a resin M1 contained in a product of the fiber-reinforced plastic in Step 101 has a larger number average molecular weight than a resin M2 contained in a product of the fiber-reinforced plastic in Step 201.

Step 101 is a step of acquiring identification information in advance to acquire an identification information image P1 of the fiber-reinforced plastic, and creating a database in which the identification information image P1 is stored in association with information of a product of the fiber-reinforced plastic. Preferably, the step is a step of capturing identification information in advance to acquire an identification information image P1 of the fiber-reinforced plastic, and creating the database in which the identification information image P1 is stored in association with information of a product of the fiber-reinforced plastic.

The identification information of the fiber-reinforced plastic is preferably a surface image of the fiber-reinforced plastic.

The identification information of the fiber-reinforced plastic is preferably an image obtained by capturing a surface of the fiber-reinforced plastic.

The identification information of the fiber-reinforced plastic is acquired in advance in Step 101. When the identification information is the surface image of the fiber-reinforced plastic obtained by capturing the surface of the fiber-reinforced plastic, the capturing itself may be performed by one who performs Step 101 or may be performed by one other than the one who performs Step 101.

Step 101 is also a step of creating the database including n sets of data pieces in which identification information images of fiber-reinforced plastics in a certain lot are associated with the fiber-reinforced plastics with identification information of the lot (Lot 1 to n; and P1 to Pn). In Step 101, the product information of the fiber-reinforced plastic is clear.

On the other hand, the identification information of the fiber-reinforced plastic in Step 201 is unknown. This is because it was distributed to the market, etc. An identification information image P2 is acquired by capturing identification information of the unknown fiber-reinforced plastic in Step 201, and the identification information image P2 is collated with the identification information image in the database in Step 301. If the identification image is registered in the database, it is possible to query product information of unknown fiber-reinforced plastic.

[Method for Individual Recognition: Step 101]

1. The Identification Information Image P1 is Acquired by Capturing Identification Information of the Fiber-Reinforced Plastic Itself to be Recognized.

A capturing device for capturing is not particularly limited, but is, for example, a digital camera with attached lens. The capturing device acquires identification information of the captured fiber-reinforced plastic as electronic data of the digital image send the identification information image data to a computer. For example, the capturing device is set so that the capturing device faces the identification information of the fiber-reinforced plastic and captures the entire identification information. The identification information of the fiber-reinforced plastic can be accurately captured by: adjusting the positions of the product, the ambient light source, and the camera; and by placing a polarizing filter that linearly polarizes the light entering the lens at the tip of the lens of the capturing device, for example, in order to prevent excessive light and glare reflected on the surface of the fiber-reinforced plastic. A well-known computer can be used.

Illumination may be used when capturing the identification information of the fiber-reinforced plastic.

Examples of the illumination include line scan illumination, natural light (sunlight), dome-shaped illumination (diffuse light), ring-shaped illumination, and multi-angle illumination (combining ring lights from various directions), but line scan illumination or dome-shaped illumination is preferable, and dome-shaped illumination is particularly preferable. The line scan illumination may be applied only from one direction. The image may be captured from a position of regular reflection, or may be captured from a position slightly shifted from the position of regular reflection. When the image cannot be captured because of strong reflection or the like in the case of ring-type illumination or multi-angle illumination, photographs may be combined.

Since the obtained images may be different from each other when the fiber-reinforced plastic is rotated, it is preferable to capture images from the same direction each time.

2. Identification Information and Identification Information Image

Preferably, the identification information of the fiber-reinforced plastic is, for example, a pattern of the reinforcing fibers observed on the surface of the fiber-reinforced plastic itself, and is shown in, for example, FIG. 1. In other words, the surface image of the fiber-reinforced plastic itself can be the identification information image P1. Since the individual authentication of the present invention can also be called an industrial version of fingerprint authentication, acquisition of a surface image of the fiber-reinforced plastic corresponds to acquisition of a fingerprint.

It is preferable that discontinuous fibers are randomly arranged on surfaces of the fiber-reinforced plastic, and the identification information is acquired from the randomly arranged discontinuous fibers. For example, the reinforcing fibers in the fiber-reinforced plastic shown in FIG. 1 are discontinuous fibers and are randomly arranged in two-dimension. Such a fiber morphology is different for each product even for the products of the same brand. Specifically, characteristics such as positions, directions, thicknesses, and lengths of the bundles of arranged fibers can be used as identification information because a difference occurs between individual products.

The discontinuous fibers include a discontinuous fiber bundle A1, and the area of the discontinuous fiber bundle A1 is preferably 2000 mm$^2$ or more, more preferably 4000 mm$^2$ or more, and even more preferably 8000 mm$^2$ or more, of the captured identification information image P1.

It is preferable to capture the identification information of the fiber-reinforced plastic in a range of 400 mm×400 mm, for example, as the identification information data. This range includes required amount or more of area of the identifiable discontinuous fiber bundles A1. This information may be processed and saved in a database.

The identification information image may be any non-destructive inspection data, and is not necessarily limited to an observation pattern on a surface. Specifically, the identification information image includes images acquired by an X-ray device, a γ-ray device, an ultrasonic device, a millimeter wave device, a microwave device, an overcurrent device, and a thermography or the like. Further, the non-destructive inspection data is not limited to a two-dimensional image, and may be configured as three-dimensional data.

3. Product Information

The product information preferably includes at least one of a fiber length, a fiber volume fraction, a brand of fibers, a brand of a resin, a manufacturing date, a manufacturing time, or a product serial number. The manufacturing date and time and the product serial number are associated with separately stored production process data, inspection data, transportation data, and sales history data of the product. It is preferable to use the traceability system that can extract all data related to individual products.

4. Database

The database is created by: acquiring an identification information image P1; and storing product information of the fiber-reinforced plastic corresponding to the acquired image in association with the image. The database is a database in which identification information of a plurality of fiber-reinforced plastics and product information corresponding to the identification information are stored in association with each other. It is preferable to store the database in a storage unit of the computer.

5. Fiber-Reinforced Plastic as Molding Material

The fiber-reinforced plastic in Step 101 is preferably a molding material. It is preferable that the molding material is compression-molded to form a molded body, and the compression-molding is more preferably cold press molding using a mold including an upper mold and a lower mold.

[Method for Individual Recognition: Step 201]

1. Acquisition of the Identification Information Image P2

Step 201 is a step of acquiring the identification information of the fiber-reinforced plastic 20 again after the step 101 to acquire the identification information image P2. The capturing device may be the same as in Step 101.

The identification information of the fiber-reinforced plastic is acquired in Step 201. When the identification information is the surface image of the fiber-reinforced plastic obtained by capturing the surface of the fiber-reinforced plastic, the capturing itself may be performed by one who performs Step 201 or may be performed by one other than the one who performs Step 201.

2. Fiber-Reinforced Plastic as Molded Body

The fiber-reinforced plastic in Step 201 is preferably a molded body, and the molded body is preferably obtained by compression-molding a molding material.

3. Identification Information Provided in Fiber-Reinforced Plastic

The compression-molding is preferably cold-press molding using a mold including an upper mold and a lower mold, and the identification information is preferably a surface image of the fiber-reinforced plastic on a side in contact with the lower mold. However, it is not always necessary to capture all of the fiber-reinforced plastic on the side in contact with the lower mold.

Figure 4:
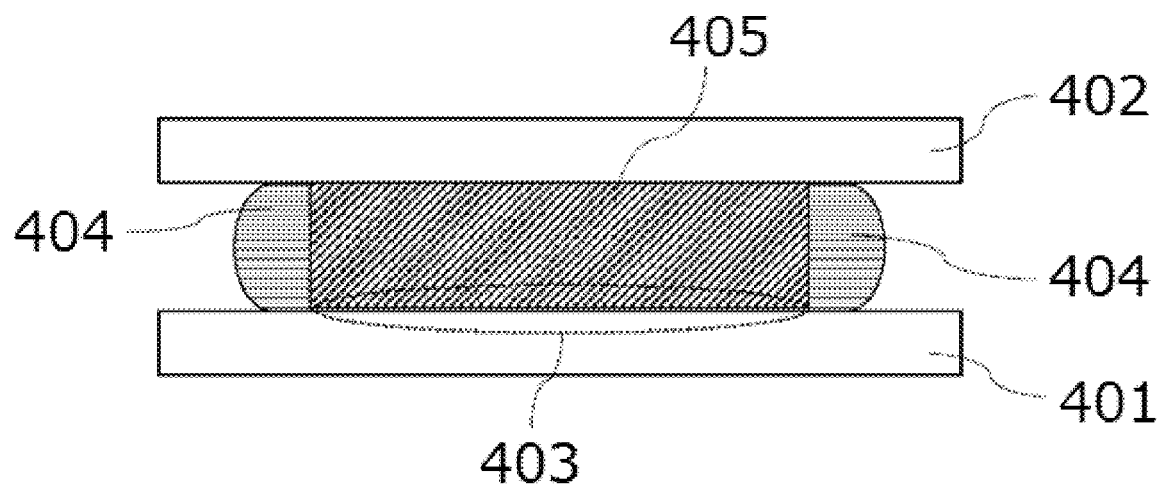
FIG. 4 is a schematic diagram showing that an inside of a molding material flows out to an outer periphery of the initially disposed molding material when cold-pressing is performed.

In the case of cold press molding, the surface of the fiber-reinforced plastic on the side in contact with the lower mold has low fluidity or is no fluidity during molding. In particular, this tendency appears remarkably when the resin of the fiber-reinforced plastic is thermoplastic resin. When cold-pressing a fiber-reinforced plastic (molding material) whose resin is a thermoplastic resin, since the mold has a plasticization temperature or lower, the thermoplastic resin on the surface of the molding material is solidified at the moment when the heated molding material comes into contact with the lower mold to form a non-flowing region. When the fiber-reinforced plastic is placed on the lower mold, a surface that is initially in contact with the lower mold is indicated by reference sign 403 in FIG. 4, for example. Reference sign 401 in FIG. 4 denotes a lower mold, and reference sign 402 in FIG. 4 denotes an upper mold. The inside of the molding material is maintained at a plasticization temperature or higher even after being placed on a lower mold. When the upper mold is lowered and a pressing pressure is applied to the molding material, the fiber-reinforced plastic therein flows out of the molding material (for example, 404 in FIG. 4). Due to this outflow, a flowing region is formed in an outer peripheral region of a surface where the molding material first comes into contact with the lower mold.

Figure 5A:
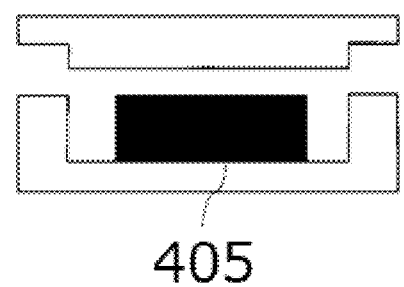
FIG. 5A is a schematic diagram showing a state in which a molding material is disposed in a mold and the upper mold is lowered (without applying pressing pressure).
Figure 5B:
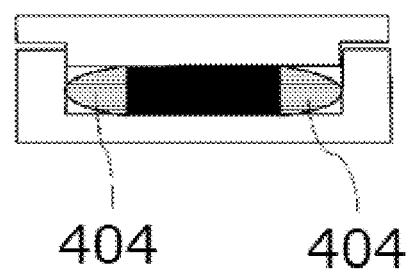
FIG. 5B is a schematic diagram showing a state in which the upper mold is closed and applies a pressure to the molding material.
Figure 6A:
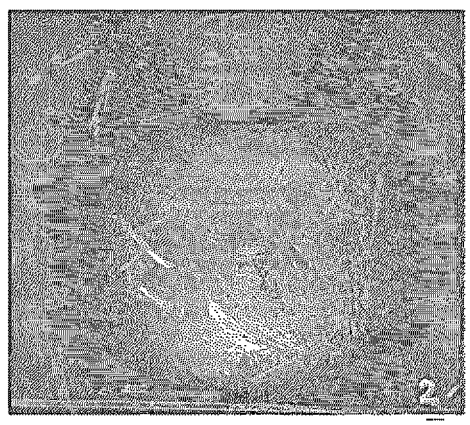
FIG. 6A is an image of a surface of a fiber-reinforced plastic captured using ring illumination.
Figure 6B:
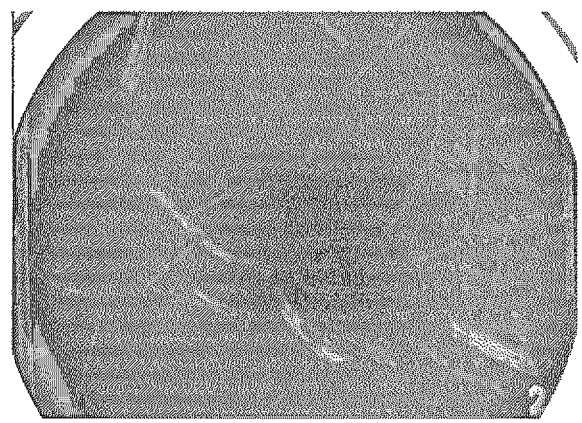
FIG. 6B is an image of a surface of a fiber-reinforced plastic captured using dome illumination.

A similar state is shown in FIGS. 5A and 5B. FIG. 5A is a state in which the molding material is disposed in a mold, and FIG. 5B is a state in which a pressing pressure is applied to the molding material. Therefore, when the surface image of the fiber-reinforced plastic on the side in contact with the lower mold is used as the identification information in Step 201, the identification information is preferably present in the non-flowing region or the low-flowing region. It is more preferable that the surface image of the fiber-reinforced plastic on the side in contact with the lower mold is present in the non-flowing region. If the identification information is present in this region, the fiber morphologies in the identification information image P1 and the identification information image P2 are substantially the same, and the collation in Step 301 becomes easy.

4. Identification During Manufacturing Process

Figure 2:
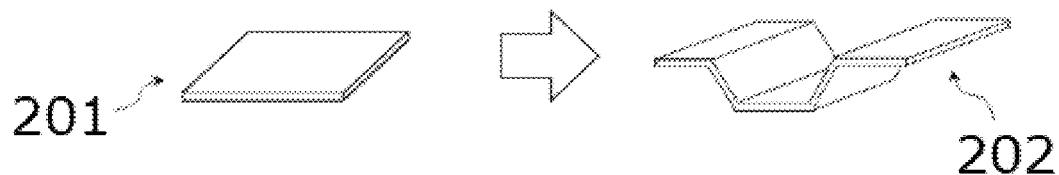
FIG. 2 is a schematic diagram showing that the molding material has become a molded body.

The fiber-reinforced plastic captured in Step 201 is preferably a molded body manufactured in Step 101 and then compression-molded. That is, the molding material of reference sign 201 in FIG. 2 may be a target for capturing in Step 101, and the molded body 202 after molding may be a target for capturing in Step 201. Capturing images in steps 101 and 201 may be performed at a manufacturing site of the molding material and a manufacturing site of the molded body, respectively, so that the fiber-reinforced plastic as the molding material and the fiber-reinforced plastic as the molded body can be individually authenticated.

Conventionally, QR code (registered trademark) is printed on a surface of a fiber-reinforced plastic by LASER marking as in the invention described in Patent Literature 1, for example, and individually authentication has been performed by reading the QR code with a scanner. The QR code (registered trademark) contains product information of the fiber-reinforced plastic. However, an expensive dedicated marking device is required to use the laser marking described in Patent Literature 1. In addition, since a marking trace (for example, a QR code (registered trademark)) is left on a part of the product, the application is difficult for the product requiring an appearance. Further, in the case of using a molding material in which a thermoplastic resin is used for the fiber-reinforced plastic, the resin is heated in a molding step, and the marking disappears. That is, the product information associated at the manufacturing site of the molding material needs to be applied again at the manufacturing site of the molded body. Since the method for individual recognition of fiber-reinforced plastic in the present invention is based on the unique identification information possessed by the fiber-reinforced plastic, the method does not require the expensive dedicated marking device and a process for identification and equipment therefor. Further, it is not necessary to reapply the product information associated with the molding material in the manufacturing process of the molded body.

5. Distribution of Fiber-Reinforced Plastic

Figure 3:
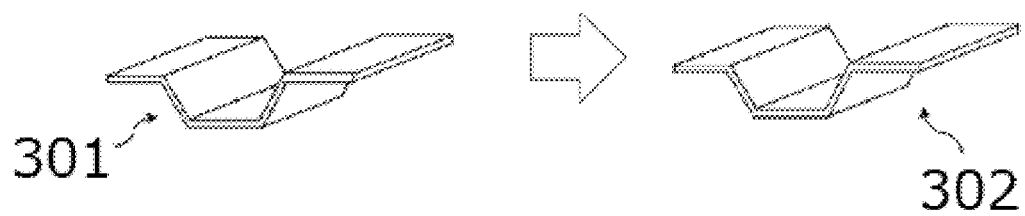
FIG. 3 is a schematic diagram showing a molded body before and after distribution.

The fiber-reinforced plastic imaged in Step 201 may be one that is manufactured in Step 101, shipped, and distributed on the market. The fiber-reinforced plastic in the present invention may be employed in automobile components and the like. That is, the molded body of reference sign 301 in FIG. 3 may be an imaging target in Step 101, and the molded body 302 after flowing may be an imaging target in Step 201.

It is preferable to keep a predetermined specific location as the identification information that is not damaged by, for example, rubbing or colliding with other members in the use state when the fiber-reinforced plastic is distributed on the market. If damage to the surface can be avoided as much as possible, the identification information can be clearly secured over a long period of time, for example, until the product is discarded.

[Method for Individual Recognition: Step 301]

Step 301 is a step of performing individual recognition of the fiber-reinforced plastic by collating the acquired identification information image P2 with the identification information image P1 stored in the database.

1. Collation

The collation between the identification information image P2 and the identification information P1 stored in the database can be realized by, for example, a computer. The computer has, for example, a well-known computer configuration; includes a central processing unit, a memory, and a storage unit; and operates based on a program stored in advance in the storage unit. A capturing device; an input unit for a user to perform an input operation; and an output unit for displaying an image captured by the capturing device and a user interface of the system on a screen, are connected to the computer so that data communication can be performed. The input to the computer may be, for example, a pointing device such as a mouse or a keyboard. The output unit may be, for example, a device having only a screen display function such as a display, or a transmitting device that transmits a recognition result or the like to a peripheral device such as another computer or a printer.

The collation is a method for recognizing and identifying the fiber-reinforced plastic captured by the capturing device by collating the identification information image P2 acquired by capturing with the capturing device and the identification information image P1 stored in the database. The image matching means utilizes well-known image recognition technology such as feature-based matching which performs: preprocessing that removes image noise and emphasizes image features by averaging brightness, hue conversion, edge detection, various filters such as Gaussian, opening, and closing, and semantic segmentation using methods such as convolutional neural networks; followed by extracting features specific to individual products in a feature point extraction process such as Oriented-BRIEF, Accelerated KAZE, and Feature from Accelerated Segment Test; and specifying the pair of images with the highest degree of matching to identify the fiber-reinforced plastic. The image matching means searches for an identification information image P1 stored in the database that completely matches or substantially matches the identification information image P2 from the capturing device, and identifies the fiber-reinforced plastic.

For example, the identification information of the fiber-reinforced plastic includes a shape and an arrangement of the fiber bundles observed on the surface of the fiber-reinforced plastic. Contour information (length, thickness, angle, and curvature) of each fiber bundle expressed by a luminance gradient is extracted as a feature point from a difference image between the identification image and an image after applying a Gaussian filter having different smoothing scale or a non-linear diffusion filter to the identification image. Further, dominance direction vectors unique to each feature point and 64-dimensional luminance gradient vectors are calculated from the luminance gradient information of the pixels around each feature point, and these are described as features for each feature point. After correcting the influence of the rotation of the image, the illuminance, and the change in scale using the features, the positional relationship between the feature points is compared, and the degree of matching of the images is calculated. Therefore, a fiber bundle having a predetermined area or more is required as the identification information in order to perform highly accurate identification.

When there are plural of pieces of identification image information P1 with similar degree of matching to the identification image information P1 with the highest degree of matching, a plurality of fiber-reinforced plastic candidates are set as the recognition results in the first stage. Next, an auxiliary recognition unit for auxiliary identification of the fiber-reinforced plastic with different elements may be provided, but the collation is basically preferably performed so that image data completely matching the identification information image of the fiber-reinforced plastic is collated.

However, when there is image data similar to the highest match degree, a configuration may be adopted in which a plurality of candidates in the first stage are set as recognition results from the identification image information P2, and then one candidate is identified supplementary by another element such as user input with the auxiliary recognition unit.

[Fiber-Reinforced Plastic: Molding Material and Molded Body]

In either of steps 101 and 201, the fiber-reinforced plastic to be subjected to individual recognition may be a material (hereinafter sometimes referred to as a molding material) before being molded to form a three-dimensional shape, or may be a molded body having a three-dimensional shape obtained by molding a molding material. The molding material is a material for producing a molded body. The molding material is molded to form a molded body. Therefore, the molding material preferably has a flat plate shape. On the other hand, the molded body is preferably shaped and has a three-dimensional shape. The molding is preferably compression-molding, which will be described later.

However, the fiber-reinforced plastic to be captured in advance in Step 101 is more preferably a molding material. More preferably, the fiber-reinforced plastic to be captured later in Step 201 is a molded body, and the molded body is obtained by compression-molding the molding material.

[Compression-Molding]

Various molding methods can be used for molding the molding material, but it is preferable to mold by heating and pressurizing the molding material. As the molding method, a so-called compression-molding method such as cold press molding or hot press molding is preferably used.

1. Cold Press Molding

When the resin contained in the fiber-reinforced plastic is a thermoplastic resin, compression-molding using cold pressing is particularly preferable. In the cold press-molding, for example, a molding material heated to a first predetermined temperature is put into a mold set to a second predetermined temperature, and then the molding material is pressurized and cooled.

Specifically, in the case where the resin constituting the molding material is a thermoplastic resin and the thermoplastic resin is crystalline, the first predetermined temperature is equal to or higher than the melting point and the second set temperature is less than the melting point. When the thermoplastic resin is amorphous, the first predetermined temperature is equal to or higher than the glass transition temperature, and the second predetermined temperature is less than the glass transition temperature.

That is, the cold pressing method includes at least the following steps A-1) to A-2).

A-1) A step of heating the molding material to a temperature of: equal to or higher than a melting point but equal to or lower than a decomposition temperature when the thermoplastic resin is crystalline; or equal to or higher than a glass transition temperature but equal to or less than a decomposition temperature when the thermoplastic resin is amorphous.

A-2) A step of placing the molding material heated in A-1) in a mold adjusted in a temperature of: less than the melting point when the thermoplastic resin is crystalline; or less than the glass transition temperature when the thermoplastic resin is amorphous, and pressurizing the molding material.

By performing these steps, the molding of the molding material can be completed.

When the molding material is charged into a mold, a sheet of molding material or plural sheets of molding material may be used in accordance with a plate thickness of a target molded body. When plural sheets of the molding material are used, the plural sheets may be laminated in advance and the laminate may be heated; or the heated sheets of molding material may be laminated and then the laminate may be charged into a mold; or the heated sheets of molding material may be laminated sequentially in a mold. The smaller the difference between a temperature of the lowermost molding material and a temperature of the uppermost molding material, the better in the case of laminate. From this viewpoint, it is preferable to laminate the sheets before charging into the mold. For example, a mold, a nip roller, or the like can be used for the pressing in A-1). Each of the above steps must be performed in the above order, but another step or the other steps may be included between the steps. The other step(s) include, for example, a shaping step of shaping the molding material into a shape of a cavity of the mold in step A-2) before step A-2), using a shaping mold different from the mold used in step A-2).

2. Hot Press Molding

In the hot press molding, for example, a molding material is charged into a mold, the temperature of the mold is increased to a first predetermined temperature, and the mold is cooled to a second predetermined temperature. Specifically, when the thermoplastic resin constituting the molding material is crystalline, the first predetermined temperature is equal to or higher than the melting point, and the second predetermined temperature is less than the melting point. When the thermoplastic resin constituting the molding material is amorphous, the first predetermined temperature is equal to or higher than the glass transition temperature, and the second predetermined temperature is less than the glass transition temperature.

The hot press molding preferably includes at least the following steps B-1) to B-4).

B-1) Step of placing the molding material in a mold (on a lower mold).

B-2) A step of pressurizing the molding material while raising the temperature of the mold to a temperature of: equal to or higher than the melting point of the thermoplastic resin but equal to or lower than the pyrolysis temperature when the thermoplastic resin is crystalline, or to a temperature equal to or higher than the glass transition temperature of the thermoplastic resin and equal to or lower than the pyrolysis temperature when the thermoplastic resin is amorphous (first pressing step).

B-3) One or more pressing steps in which the pressure in the final step is 1.2 times of the pressure in the first pressing step or more and 100 times of the pressure in the first pressing step or less (second pressing step).

B-4) A step of adjusting the temperature of the mold to a temperature of: less than a melting point when the thermoplastic resin is crystalline; or less than a glass transition temperature when the thermoplastic resin is amorphous.

By performing these steps, the molding of the molding material can be completed.

3. Common Matters

Steps A-2) and B-3) are steps of applying pressure to the molding material to obtain a molded body having a desired shape. The molding pressure at these times is not particularly limited, but is preferably as low as possible within a range in which a desired shape of the molded body can be obtained. More specifically, the molding pressure is preferably less than 30 MPa, more preferably 20 MPa or less, and still more preferably 10 MPa or less, with respect to the projected area of the mold cavity. When the molding pressure is less than 30 MPa, it is preferable because capital investment or maintenance cost of the press machine is not required. As a matter of course, various steps may be inserted between the above steps during compression-molding. For example, vacuum press molding in which compression-molding is performed under vacuum may be used between the above steps.

[Number Average Molecular Weight of Resin M1 and Resin M2]

In the present invention, the resin M1 contained in the fiber-reinforced plastic product imaged in Step 101 has a larger number average molecular weight than the resin M2 contained in the fiber-reinforced plastic product captured in Step 201.

The number average molecular weight of the resin M1 and the resin M2 in the present invention may be preferably measured in a surface layer region of the fiber-reinforced plastic. The surface layer region is a region of less than 50 μm from the surface of the fiber-reinforced plastic.

1. Measurement of Number Average Molecular Weight

A sample to be measured is cut by using a flat blade in a surface layer region of the molded body (or a central region of the molded body) after cold pressing. In the case of coated fiber-reinforced plastic, the coating is removed. The number average molecular weight can be determined by gel permission chromatography (GPC).

2. Molecular Weight Decrease in Manufacturing Process

When the fiber-reinforced plastic captured in Step 101 is used as a molding material and the fiber-reinforced plastic after being molded to form a molded body is captured in Step 201, the molecular weight of the resin contained in the fiber-reinforced plastic decreases.

In particular, in the case of using a molding material using carbon fibers as reinforcing fibers containing discontinuous carbon fibers having a weight average fiber length of 1 mm or more and 100 mm or less, heating is required in a high-temperature region (275 to 330° C. when the resin is nylon 6) in order to improve fluidity during molding.

Under such severe heating conditions, especially, molecular weight of the polyamide resin present in the surface layer region is greatly decreased.

3. Decrease in Molecular Weight During Distribution

The fiber-reinforced plastic imaged in Step 201 may be one that is manufactured in Step 101, shipped, and distributed on the market. The fiber-reinforced plastic in the present invention may be employed in automobile components and the like. When the fiber-reinforced plastic is distributed on the market, the fiber-reinforced plastic is exposed to rain and wind over time, and a number average molecular weight of the resin contained in the fiber-reinforced plastic decreases. Therefore, the resin M1 to be contained in the fiber-reinforced plastic product to be captured in advance has a larger number average molecular weight than the resin M2 contained in the fiber-reinforced plastic product to be captured for later individual recognition.

4. Evaluation of Resin Deterioration Degree

The deterioration degree of the resin contained in the fiber-reinforced plastic may be evaluated after performing individual recognition using the method for individual recognition. The resin deterioration is evaluated by measuring the number average molecular weight contained in the resin M1 and the resin M2.

EXAMPLE

The present invention will be specifically described below using Examples, but the present invention is not limited thereto.

1. Material 1.1 Carbon Fiber

Carbon fiber "Tenax" (registered trademark) STS40-24K (average fiber diameter: 7 μm, number of single fibers: 24,000) manufactured by Teijin, Ltd.

1.2 Thermoplastic Resin

Polyamide 6 (A1030 manufactured by Unitika Ltd., sometimes abbreviated as PA6)

2. Various Measurements

Each value in the present example was determined according to the following method.

(1) Measurement of Volume Fraction (Vf) of Fibers

A 100 mm×100 mm sample was cut out from the fiber-reinforced plastic. The sample was heated for 1 hour in a nitrogen atmosphere in an electric furnace (FP410 manufactured by Yamato Scientific Co., Ltd.) heated to 550° C. to burn away an organic substance such as a matrix resin.

The weights of the fibers and the resin were calculated by weighing the weights of the samples before and after burning off. Next, the volume fraction of the fibers was calculated using the specific gravity of each component.

$$\text{Volume fraction }(Vf)=100\times\text{fiber volume}/(\text{fiber volume}+\text{resin volume}) \quad \text{Formula (1)}$$

3. Measurement of Number Average Molecular Weight

A sample to be subjected to the measurement was obtained by cutting a surface layer of a fiber-reinforced plastic before cold pressing (molding material) or after cold pressing (molded body) with a flat blade. As for the sampling weight, the entire region of the test piece of 135 mm×65 mm was scraped with a flat blade to obtain a measurement sample of about 80 mg to 120 mg.

The molecular weight was determined by gel permeation chromatography (GPC). The device was HLC-8220GPC manufactured by Tosoh Ltd. The detector was a differential refractometer (RI). $CF_3COONa$ was added to hexafluoroisopropanol (HFIP) so that the solvent was 10 mM (mol/l). As columns, one HFIP-LG and two HFIP-806M manufactured by Shodex were used. A solvent flow rate was 0.8 ml/min, and a sample concentration was about 0.1 wt/vol %. The solution was filtered through a filter to remove insoluble matters and the filtrate was used as a measurement sample. Based on the obtained elution curve, the number average molecular weight (Mn) was calculated in terms of polymethyl methacrylate (PMMA).

Example 1

1. Preparation of Fiber-Reinforced Plastic for Pre-Capturing

A carbon fiber "Tenax" (registered trademark) STS40-24K (average fiber diameter: 7 μm, number of single fibers: 24,000) manufactured by TEIJIN LIMITED and cut to a fiber length of 20 mm was used as the carbon fiber, and nylon 6 resin A1030 manufactured by Unitika Ltd. was used as the resin. A molding material of the carbon fiber and the nylon 6 resin was prepared in which carbon fibers were randomly oriented in two dimensions, based on a method described in U.S. Pat. No. 8,946,342. The obtained molding material was heated at 2.0 MPa for 5 minutes in a press machine heated to 270° C. to obtain a flat fiber-reinforced plastic having a width of 400 mm×a length of 400 mm×an average thickness of 2.6 mm.

When the carbon fibers contained in the flat fiber-reinforced plastic were analyzed, the carbon fiber volume fraction (Vf) was 35%, the fiber length of the carbon fiber was a constant length, and the weight average fiber length was 20 mm.

The flat plate-shaped fiber-reinforced plastic was used as a molding material to be molded later to form a molded body. The surfaces of the fiber-reinforced plastics has two-dimensional random orientation as shown in FIG. 1.

A total 100 sheets of fiber-reinforced plastic were prepared as molding materials, and the process proceeds to Step 101.

Additional two sheets of fiber-reinforced plastics were further prepared in order to measure the number average molecular weight. The two sheets were for measuring the number average molecular weight of the resin M1 contained in the fiber-reinforced plastic product to be captured in Step 101 and the resin M2 contained in the fiber-reinforced plastic product to be captured in Step 201.

2. Step 101

The surface of the fiber-reinforced plastic prepared in the above 1 was used as identification information, and the surface was captured by RX100V manufactured by SONY, and the corresponding product information was associated with the captured image to create a database. A total 100 sheets of molding material prepared in 1 were captured similarly to create the database. The product information was a serial number, a manufacturing date, and a manufacturing time.

3. Compression-Molding

The fiber-reinforced plastic (molding material) from which the identification information of the surface was acquired in Step 101 was heated to 290° C. which is equal to or higher than the plasticization temperature of the polyamide 6 (thermoplastic resin) using a resin sheet heating device (model H7GS-73408) manufactured by NGK Kilntech Ltd.

The heated fiber-reinforced plastic (molding material) was placed on a lower mold set to 150° C. of a mold with a clearance of 400 mm×400 mm×2.5 mm. At this time, a surface (capturing surface) provided with the identification information was a surface of the fiber-reinforced plastic in contact with the lower mold.

The upper mold of the mold was lowered to pressurize the molding material, and the molding material was cold-pressed at 20 MPa for 1 minute. After the upper mold of the mold was raised to completely open the mold, the prepared molded body was removed from the lower mold and the molded body was taken out.

All of the fiber-reinforced plastics, which is a total 100 sheets of molding material prepared in the above 1, were cold-pressed and taken out as molded bodies.

4. Step 201

Identification information of the fiber-reinforced plastic (molded body) prepared by cold pressing was captured to obtain an identification information image P2. The identification information is a surface of the fiber-reinforced plastic (molded body) that was in contact with the lower mold.

5. Step 301

The acquired identification information image P2 was compared with the identification information image P1 stored in the database, and individual recognition of the fiber-reinforced plastic was performed.

Identification was performed using only the images with the highest degree of matching by identifying feature points such as the position, direction, thickness, and length of the fiber bundles observed on the surface of the fiber-reinforced plastic. As a result, 90 sheets out of 100 sheets were correctly recognized. In other words, in the identification by only the system, one identification information image P1 could be extracted based on the identification information image P1 with an accuracy of 90% (TOP-1 ACCURACY is 90%).

Further, 5 identification information images P1 were presented in descending order of degree of matching with the identification information image P2. The result contained the correct identification information image P1 with a probability of 100%.

In other words, when a person supplementary selects one from the top 5 items extracted by the system, one identification information image P1 could be extracted based on the identification information image P1 with an accuracy of 100% (TOP-5 ACCURACY is 100%).

[Number Average Molecular Weight of Resin M1 and Resin M2]

The number average molecular weight of the resin M1 was 17000, the number average molecular weight of the resin M2 was 11500. The resin M1 contained in the fiber-reinforced plastic product to be captured in advance had a larger number average molecular weight than the resin M2 contained in the fiber-reinforced plastic product to be captured for later individual recognition.

INDUSTRIAL APPLICABILITY

Since the method for individual recognition of fiber-reinforced plastic is based on the unique appearance information possessed by the fiber-reinforced plastic, the method does not require the expensive dedicated marking device and a process for identification and equipment therefor.

In addition, since the present invention recognizes the unique pattern possessed by the fiber-reinforced plastic, the products can be individually identified even if the products are of the same brand, and tracking can be performed after the products are shipped.

Although the present invention has been described in detail and with reference to specific embodiments, it will be apparent to those skilled in the art that various changes and modifications can be made without departing from the spirit and scope of the invention.

REFERENCE SIGNS LIST

101: Fiber-reinforced plastic
102: Carbon fiber bundle

201: Molding material (fiber-reinforced plastic captured in Step 101)
202: Molded body (fiber-reinforced plastic captured in Step 201)
301: Molded body (fiber-reinforced plastic captured in Step 101)
302: Molded body (fiber-reinforced plastic imaged in Step 201)
401: Lower mold
402: Upper mold
403: A surface that comes into contact with the lower mold first when the fiber-reinforced plastic is disposed in the lower mold
404: Flow, a portion where the molding material flows out to an outer periphery of an initially arranged molding material
405: Molding material

The invention claimed is:

1. A method for individual recognition of fiber-reinforced plastic, comprising the following steps:
   step 101: acquiring identification information of a fiber-reinforced plastic in advance by acquiring an identification information image P1 of the fiber-reinforced plastic, and creating a database in which the identification information image P1 is stored in association with product information of the fiber-reinforced plastic;
   step 201: acquiring an identification information image P2 containing identification information of a fiber-reinforced plastic after step 101;
   step 301: performing individual recognition of the fiber-reinforced plastic of step 201 by collating the acquired identification information image P2 with the identification information image P1 stored in the database,
   wherein a resin M1 contained in a product of the fiber-reinforced plastic in step 101 has a larger number average molecular weight than a resin M2 contained in a product of the fiber-reinforced plastic in step 201.

2. The method for individual recognition of fiber-reinforced plastic according to claim 1,
   wherein the product information includes at least one of a fiber length, a fiber volume fraction, a brand of fibers, a brand of a resin, a manufacturing date, a manufacturing time, or a product serial number.

3. The method for individual recognition of fiber-reinforced plastic according to claim 1,
   wherein the fiber-reinforced plastic in Step 101 is a molding material; and
   the fiber-reinforced plastic in Step 201 is a molded body obtained by compression-molding a molding material.

4. The method for individual recognition of fiber-reinforced plastic according to claim 3,
   wherein the compression-molding is cold-press molding using a mold including an upper mold and a lower mold, and
   the identification information image P2 is a surface image of the fiber-reinforced plastic on a side in contact with the lower mold.

5. The method for individual recognition of fiber-reinforced plastic according to claim 4,
   wherein the identification information in Step 201 is present in a non-flowing region or a low-flowing region.

6. The method for individual recognition of fiber-reinforced plastic according to claim 1,
   wherein discontinuous fibers are randomly arranged on surfaces of the fiber-reinforced plastic in Step 101, and
   the identification information in Step 101 is acquired from the randomly arranged discontinuous fibers.

7. The method for individual recognition according to claim 6, wherein the discontinuous fibers include discontinuous fiber bundles A1, and the identification information image P1 includes 2000 mm$^2$ or more of an area of the discontinuous fiber bundles AI.

8. The method for individual recognition of fiber-reinforced plastic according to claim 1,
   wherein the identification information image P1 is non-destructive inspection data.

9. The method for individual recognition of fiber-reinforced plastic according to claim 1,
   wherein line scan illumination or dome-shaped illumination is used for capturing the identification information of the fiber-reinforced plastic in Step 101.

10. A method comprising:
    evaluating a deterioration degree of a resin contained in a fiber-reinforced plastic after performing individual recognition using the method for individual recognition of fiber-reinforced plastic according to claim 1.

* * * * *